Aug. 17, 1965   J. A. SMYSER   3,201,144
TRAILER CONNECTING APPARATUS
Filed May 29, 1962   2 Sheets-Sheet 1
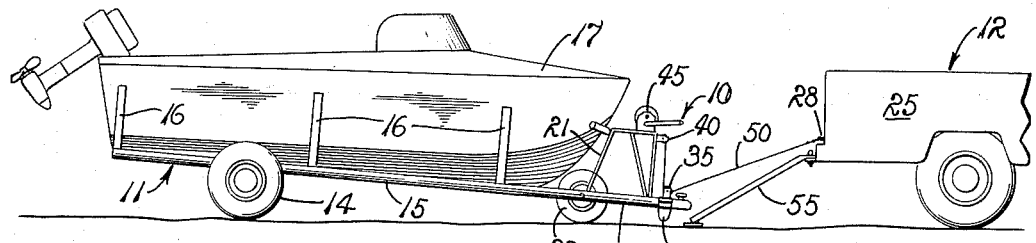
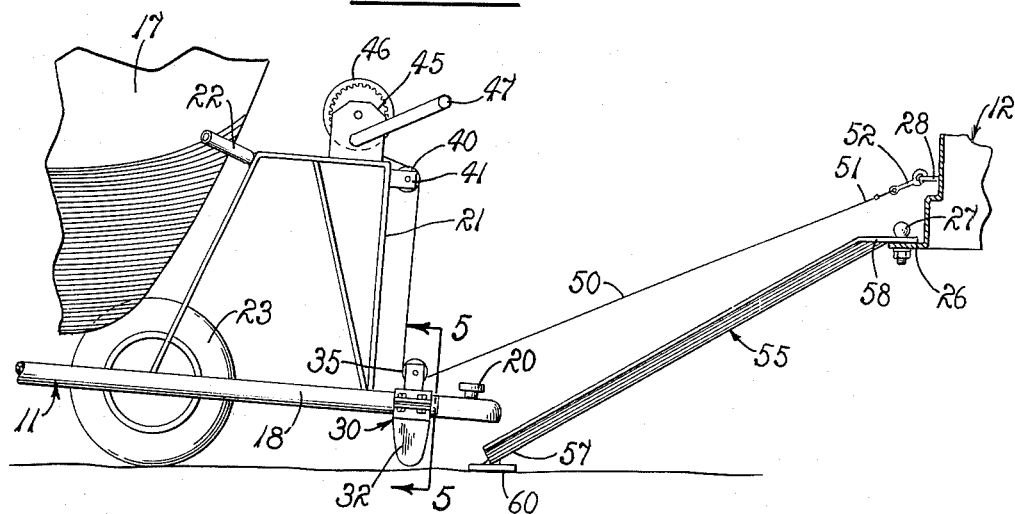
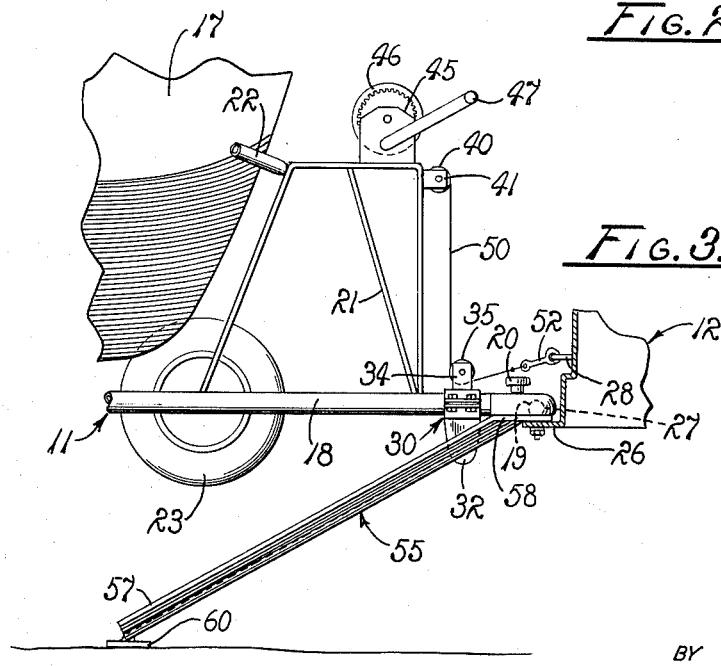
JAMES A. SMYSER
INVENTOR
HUEBNER & WORREL
ATTORNEYS
BY
Richard M. Worrel Aug. 17, 1965  J. A. SMYSER  3,201,144
TRAILER CONNECTING APPARATUS
Filed May 29, 1962  2 Sheets-Sheet 2
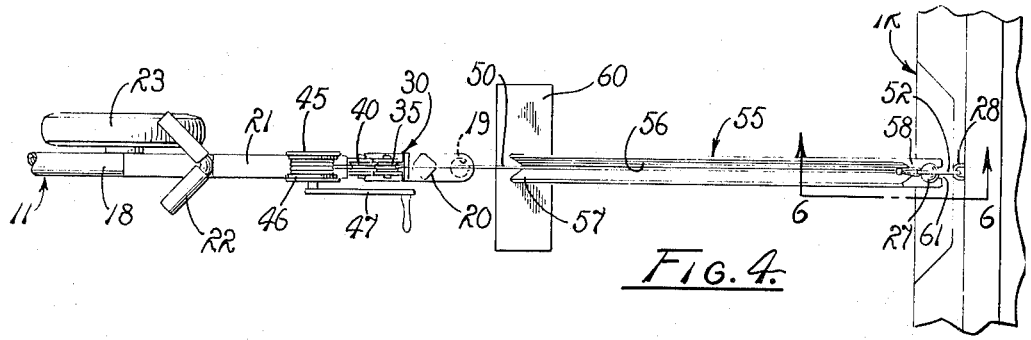
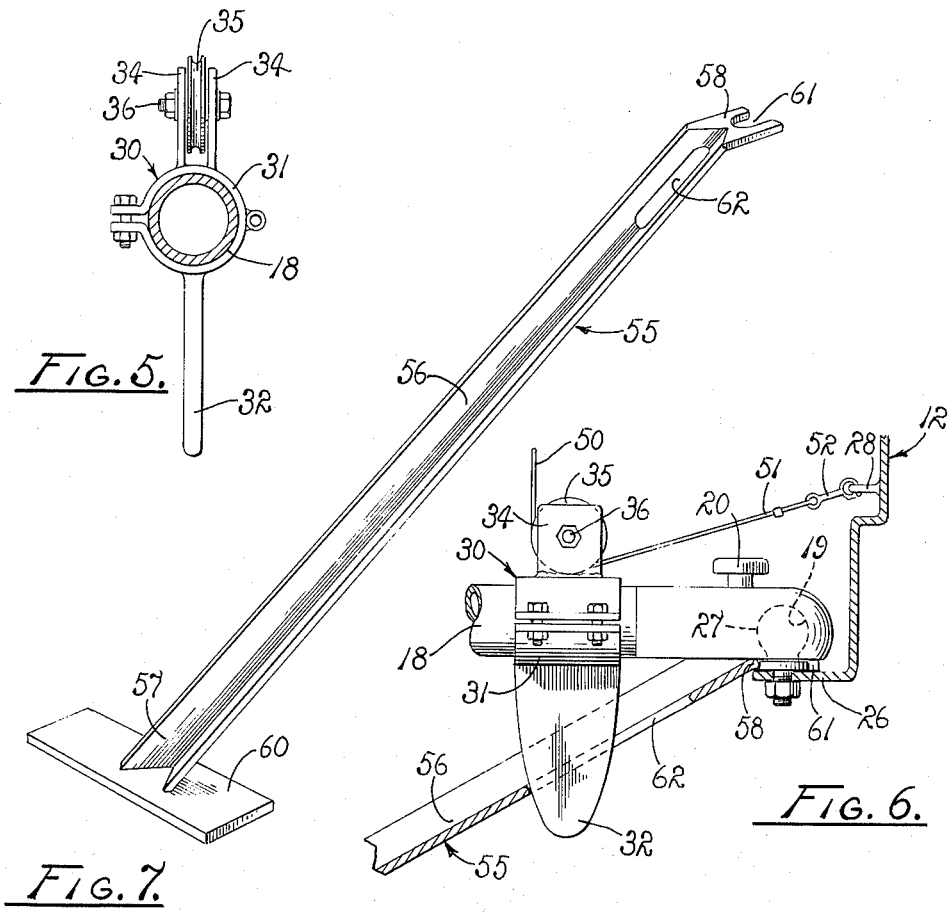
JAMES A. SMYSER
INVENTOR
HUEBNER & WORREL
ATTORNEYS
BY
Richard M. Worrel

United States Patent Office 3,201,144
Patented Aug. 17, 1965

3,201,144
TRAILER CONNECTING APPARATUS
James A. Smyser, Taft, Calif.
(2840 Pembroke Ave., Bakersfield, Calif.)
Filed May 29, 1962, Ser. No. 198,518
3 Claims. (Cl. 280—477)

The present invention relates to a trailer connecting apparatus for positioning the tongue of a trailer in coupling relation to a draft vehicle.

Two wheeled trailers of the type employed for towing boats and the like are usually balanced so that they are tongue heavy and, when parked, their draft tongues rest on the ground or are supported in close proximity thereto by support legs, spare wheels or blocks placed thereunder. In order to couple such a trailer to a draft vehicle, the tongue must be manually lifted, rocking the trailer about the axes of the wheels elevationally to position the tongue in connecting relation with the hitch on the draft vehicle. Such operation is both tedious and hazardous in that when loaded, the trailers are frequently imbalanced to such a degree that lifting of their tongues is only accomplished with a great deal of difficulty. Also, it is frequently necessary to maintain the tongue in an elevated position while the trailer is pulled into position or the draft vehicle is similarly manipulated.

Therefore, it is an object of the present invention to provide a trailer connecting apparatus which achieves convenient coupling of a trailer to a draft vehicle with a minimum of physical effort and without manual lifting of the trailer tongue.

Another object is to provide a trailer connecting apparatus which permits such convenient coupling without other manipulation of the draft vehicle.

Another object is to provide such a connecting apparatus which accurately guides the trailer tongue into register with the draft vehicle hitch without manual manipulation of either connecting components.

Another object is to provide such an apparatus which is readily adapted to existing trailers.

Another object is to provide such a connecting apparatus which is adapted to displace the trailer, from areas not readily accessible, to a draft vehicle for subsequent connection thereto.

Another object is to provide a trailer connecting apparatus which is economical, safe and convenient to use.

Other objects and advantages of the present invention will become more readily apparent in the subsequent description in the specification.

In the drawings:

FIG. 1 is a side elevation of an embodiment of the present invention disposed between a two wheeled boat trailer and a fragmentary representation of a draft vehicle.

FIG. 2 is a somewhat enlarged side elevation of the trailer connecting apparatus of FIG. 1 shown in a pre-coupled position.

FIG. 3 is a side elevation of the trailer connecting apparatus shown in a coupled position.

FIG. 4 is a top plan view of the trailer connecting apparatus in the position of FIG. 2.

FIG. 5 is a somewhat enlarged substantially vertical section taken on line 5—5 of FIG. 2.

FIG. 6 is a somewhat enlarged longitudinal section taken on a plane represented by the line 6—6 of FIG. 4 and showing the trailer connecting apparatus in the coupled position of FIG. 3.

FIG. 7 is a somewhat enlarged perspective view of a trailer tongue guide ramp of the present invention removed from the operating positions shown in the preceding figures.

Referring more particularly to the drawings, the trailer connecting apparatus embodying the principles of the present invention is indicated generally at 10 disposed between a trailer 11 and a draft vehicle fragmentarily shown at 12. The trailer 11 is conveniently represented in the present embodiment as being of the boat transporting type having a pair of axially aligned ground engaging wheels 14, only one of which is visible, supporting an elongated frame 15. The frame includes a plurality of longitudinally spaced substantially upright support beams 16 in cradling supporting relation to a boat 17 rested on the frame 15. A draft tongue 18 is forwardly extended the frame and has a downwardly opening socket 19 closely adjacent to its outer end. A locking handle 20 is mounted rearwardly above the socket 19 in screw-threaded relation within the tongue to vary the size of the socket opening. A tower super-structure or pylon 21 is rigidly mounted on the tongue and provides an upper rearwardly extended cradle arm 22 which is adapted to constrain the bow of the boat 17. A spare ground engaging wheel 23 is mounted on the tongue adjacent to the frame to position the tongue in elevationally spaced relation from the ground when the trailer 11 is detached from the draft vehicle 12.

The draft vehicle 12 provides a rear body portion 25 which, as best shown in FIG. 6, includes a rearwardly substantially horizontally extended bracket 26. A substantially upright ball type hitch member 27 is rigidly mounted on, and upwardly extended from, the flange of a size readily to be received within the socket 19 of the tongue 18 with the handle 20 in a loosened condition. A circular eye member 28 is rigidly mounted, as by welding or the like, on the body 25 of the draft vehicle in upwardly spaced substantially vertically aligned relation with the ball hitch 27. The structure described to this point is well known and typifies a suitable operational environment for the device of the present invention.

The trailer connecting apparatus 10 of the instant invention provides a combined cable and tongue guide bracket 30 which has a centrally disposed circular clamping portion 31 releasably secured about the tongue 18 between the pylon 21 and the handle 20. The bracket includes a lower depending ramp follower 32 and a pair of oppositely upwardly extended transversely spaced arms 34. A cable guide sheave 35 is rotatably mounted on a shaft 36 extended between the arms 34 of the bracket.

An upper cable guide sheave 40 is similarly rotatably mounted between a pair of arms 41 rigidly mounted in forward extension from the pylon 21 and in substantially coplanar relation with the lower cable guide sheave 35. A cable winding winch 45 is rigidly mounted on the tower and provides a cable drum 46 which is actuated through a gear reducing train, not shown, by a crank handle 47. An elongated flexible cable 50 is secured to, and is wound about, the drum 46 to provide a running end 51 which is trained over the upper sheave 40 and under the lower sheave 35. A retractably opening snap member 52 is rigidly mounted on the running end of the cable for engagement with the eye 28 in the body 25 of the draft vehicle 12.

A guide ramp 55 is adapted to be extended between the trailer and the draft vehicle and provides an elongated V-shaped channel member 56 which has a lower end 57 and an opposite upper end 58. A substantially flat rectangular base 60 is rigidly secured, as by welding or the like, to the lower end of the channel member in oblique angular relation thereto so that when the base is rested upon the ground, the channel member 56 is inclined upwardly therefrom. The upper end 58 of the channel member also is obliquely angularly extended in substantially parallel relation to the base 60. The upper end 58 is bifurcated to provide a notch 61 which is adapted to receive the neck portion of the ball hitch 27. An elongated slot 62 is formed through the inclined portion of the channel closely adjacent to the upper end 58.

OPERATION

The operation of the described embodiment of the subject invention is believed to be readily apparent and is briefly summarized at this point. In utilizing the apparatus, the draft vehicle is conveniently positioned in forwardly spaced relation to the trailer 11. Such positioning need not be critical but only sufficiently close to be within the range of the cable 50.

The ramp 55 is rested on its base 60 in the inclined position shown in FIGS. 1, 2, 3, 6 and 7, the notch 61 is aligned with the neck of the ball hitch 27 and the ramp is slid forwardly and rested on the flange 26. So positioned, the channel member 56 is disposed to receive the follower 32.

The cable snap 52 is fastened, as shown in FIG. 2, to the eye 28 in the body 25 of the draft vehicle 12. It is apparent that the snap is able to slide within the eye 28 to accommodate any angular displacement of the trailer from alignment with the draft vehicle. The crank handle 47 is manually actuated in a direction to rotate the drum 46 of the winch 45 to wrap the cable 50 thereabout effectively shortening the running length of the cable to draw the trailer 11 toward the draft vehicle 12. Upon further actuation of the crank handle 47, the tongue 18 is drawn toward the guide ramp and the ramp follower 32 engages and slides upwardly within the channel member 56. The follower is spaced the same distance from the socket member 19 as the slot 62 is spaced from the ball hitch. Thus, as the tongue 18 is drawn upwardly and toward the body 25 of the draft vehicle, the follower 32 drops through the slot 62 in the channel the moment the socket is aligned with the ball hitch. When the follower descends through the slot, the socket drops over the ball hitch in coupling relation thereto. The ramp 55 is then slid rearwardly from the flange 26 and disengaged from the draft vehicle. By slackening the tension on the cable 50, the socket is lowered into full coupling position on the ball hitch. The handle 20 is then manipulated in the well-known manner to lock the socket on the hitch. The cable 50 may then be disconnected and reefed in on the winch 45 or permitted to remain in position, as desired.

When it is desired to disconnect the trailer 11 from the draft vehicle 12, the handle 20 is manipulated to release the socket 19 from the ball hitch 27. The cable may then be tensioned to elevate the tongue 18 and socket slightly so that the ramp 55 may be returned to the operable position shown in FIGS. 1, 2, 3 and 6. The cable is tensioned further to elevate the tongue and withdraw the follower 32 from its slot 62. The trailer and draft vehicle are then urged apart and the follower permitted to slide down the channel member 56 as the tongue is gradually lowered to the ground.

The disclosed embodiment of the present invention has adidtional utility on occasions when it is not possible to position the draft vehicle sufficiently closely to the trailer to make connection. Such occasion may arise when pulling a boat and trailer from the water and the shoreline cannot be traversed by the draft vehicle. In this instance, the cable 50 is readily secured to any available anchorage along the shore whereby with rotation of the crank handle 47 to draw in the cable the trailer is winched to a position accessible to the draft vehicle where the connection is made in the above described manner. It is noted that during such winching operation the lower sheave 35 positions the cable 50 closely adjacent to the tongue 18 so that the tongue is dependably supported a distance above the ground to minimize earth engagement and "digging in" of the tongue as frequently occurs with conventional mechanisms and to achieve proper guiding effect.

In view of the foregoing, it will be recognized that the disclosed embodiment of the present invention provides a simplified trailer connecting apparatus which requires a minimum of physical effort and achieves convenient connection and/or disconnection without manually lifting the trailer tongue and without manipulation of the draft vehicle. Also, the disclosed embodiment of the present invention is adapted to draw the trailer from areas not readily accessible to the draft vehicle to a position where such connection can be quickly and readily accomplished.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In combination with a draft vehicle having a draft hitch and a trailer having a forwardly extending tongue providing a hitch connector; a winch mounted on the trailer; cable guide means mounted on the tongue adjacent to the connector; a cable connected to the winch, threaded through the guide means and having an end extended forwardly from the tongue; an anchor mounted on the draft vehicle above the hitch thereof having the extended end of the cable connected thereto; a ramp having an end rested on the ground and an opposite end supported on the draft vehicle adjacent to the hitch providing a guide channel longitudinally thereof; and a channel follower mounted on the tongue in rearwardly spaced relation to the connector and downwardly extended from the tongue, the ramp having a follower receiving slot therethrough in alignment with the channel and spaced from the hitch substantially the same as the follower is spaced from the connector.

2. In combination with a draft vehicle having a draft hitch and a trailer having a forwardly extended tongue providing a hitch connector; a winch mounted on the trailer; cable guide means mounted on the tongue adjacent to the connector; a cable connected to the winch, threaded through the guide means and having an end extended forwardly from the tongue; an anchor mounted on the draft vehicle above the hitch thereof; means on the extended end of the cable adapted for connection to the anchor; a ramp having an end adapted to rest on the ground and an opposite end adapted to be supported on the draft vehicle adjacent to the hitch providing a guide channel longitudinally thereof; and a channel follower mounted on the tongue in rearwardly spaced relation to the connector and downwardly extended from the tongue, the ramp having a follower receiving slot therethrough in alignment with the channel and spaced from the hitch substantially the same as the follower is spaced from the connector.

3. In combination with a draft vehicle, and a trailer having a pair of axially aligned wheels, an elongated frame borne by said wheels, and a tongue forwardly extended therefrom, said trailer including a winch mechanism having a cable wound thereon presenting a free end, and a support frame mounting said winch on the trailer in upwardly substantially vertically spaced relation from said tongue, said draft vehicle providing a hitch, and an anchorage member disposed in upwardly substantially vertically spaced relation from the hitch; a trailer hitching apparatus comprising a first cable guide sheave rotatably mounted on said winch support frame in forward extension therefrom having the cable trained thereabout; a second rotatable cable guide sheave mounted on the forward end portion of the tongue in spaced substantially coplanar relation to said first cable guide sheave and having the cable trained thereabout; a releasable fastening member mounted on said free end of the cable adapted for connection with said anchorage member on the draft vehicle; follower means mounted on said tongue in depending relation therefrom; and an inclined channeled guide ramp adapted slidably to receive said follower means and having a substantially flat foot portion rested on the ground and an opposite upper bifurcated end releasably connected with said hitch on the draft vehicle, said guide ramp providing an elongated slot adjacent to said upper bifurcated end thereof to receive said follower means therethrough.

References Cited by the Examiner

UNITED STATES PATENTS

| | | | |
|---|---|---|---|
| 1,602,112 | 10/26 | Johnson | 214—85.1 X |
| 2,489,112 | 11/49 | Talbert | 280—478 X |
| 2,708,045 | 5/55 | Shontz | 214—85.5 X |

FOREIGN PATENTS 930,132   7/55   Germany.

A. HARRY LEVY, *Primary Examiner.*